United States Patent [19]

Tran et al.

[11] Patent Number: 5,672,389

[45] Date of Patent: Sep. 30, 1997

[54] LOW-DENSITY RESIN IMPREGNATED CERAMIC ARTICLE AND METHOD FOR MAKING THE SAME

[75] Inventors: Huy K. Tran, Mountain View; William D. Henline, Palo Alto; Ming-ta S. Hsu, San Jose; Daniel J. Rasky, Palo Alto; Salvatore R. Riccitiello, San Jose, all of Calif.

[73] Assignee: The United States of America as represented by the Administrator of the National Aeronautics and Space Administration, Washington, D.C.

[21] Appl. No.: 523,726

[22] Filed: Jun. 8, 1995

Related U.S. Application Data

[62] Division of Ser. No. 212,640, Mar. 14, 1994, Pat. No. 5,536,562.

[51] Int. Cl.⁶ ........................................................ B05D 3/00
[52] U.S. Cl. ........................ 427/294; 427/336; 427/350; 427/379; 427/393.6; 427/430.1
[58] Field of Search ...................................... 427/294, 336, 427/350, 379, 393.6, 430.1

[56] References Cited

U.S. PATENT DOCUMENTS

| | | | |
|---|---|---|---|
| 3,138,009 | 6/1964 | McCreight | 62/315 |
| 3,213,166 | 10/1965 | Dreyling et al. | 264/59 |
| 3,243,313 | 3/1966 | Aves | 117/38 |
| 3,533,813 | 10/1970 | Geltman | 106/41 |
| 3,952,083 | 4/1976 | Fletcher et al. | 264/63 |
| 4,031,059 | 6/1977 | Strauss | 260/375 B |
| 4,100,322 | 7/1978 | Seibold | 428/257 |
| 4,148,962 | 4/1979 | Frosch et al. | 428/366 |
| 4,255,197 | 3/1981 | Peralta et al. | 264/59 |
| 4,456,208 | 6/1984 | MacConochie | 244/158 A |
| 4,605,594 | 8/1986 | Owens et al. | 428/373 |
| 4,713,275 | 12/1987 | Riccitiello et al. | 428/76 |
| 4,743,511 | 5/1988 | Sowman et al. | 428/547 |
| 4,804,571 | 2/1989 | Jouffreau | 428/77 |
| 4,828,774 | 5/1989 | Andersson et al. | 264/60 |
| 5,006,492 | 4/1991 | Semen et al. | 501/97 |
| 5,112,545 | 5/1992 | Spain et al. | 264/103 |
| 5,135,691 | 8/1992 | Hama et al. | 264/60 |
| 5,154,778 | 10/1992 | Gardner et al. | 156/166 |
| 5,167,271 | 12/1992 | Lange et al. | 164/103 |

OTHER PUBLICATIONS

R.P. Banas et al, "Lifting Entry Vehicle Thermal Protection Review" Lockhead Report No. 4–83–4–2 (1964).

Tran et al, "Thermal Response and Ablation Characteristics of Lightweight Ceramic Ablators" AIAA 93–2790 (Jul. 1993).

*Primary Examiner*—James J. Bell
*Attorney, Agent, or Firm*—Kenneth L. Warsh; Harry Lupuloff; John G. Mannix

[57] ABSTRACT

A low-density resin impregnated ceramic article advantageously employed as a structural ceramic ablator comprising a matrix of ceramic fibers. The fibers of the ceramic matrix are coated with an organic resin film. The organic resin can be a thermoplastic resin or a cured thermosetting resin. In one embodiment, the resin is uniformly distributed within the ceramic article. In a second embodiment, the resin is distributed so as to provide a density gradient along at least one direction of the ceramic article. The resin impregnated ceramic article is prepared by providing a matrix of ceramic fibers; immersing the matrix of ceramic fibers in a solution of a solvent and an organic resin infiltrant; and removing the solvent to form a resin film on the ceramic fibers.

16 Claims, 1 Drawing Sheet

LOW-DENSITY RESIN IMPREGNATED CERAMIC ARTICLE AND METHOD FOR MAKING THE SAME

This is a division of application Ser. No. 08/212,640, filed Mar. 14, 1994 now U.S. Pat. No. 5,536,562.

ORIGIN OF THE INVENTION

The invention disclosed herein was made in the performance of work under a NASA Contract and is subject to Public Law 96-517 (35 U.S.C. §200 et seq.). The contractor has not elected to retain title in this invention.

BACKGROUND OF THE INVENTION

1. Field of the Invention

This invention relates to a low-density resin impregnated ceramic article and method for making the same. The resin impregnated ceramic article is advantageously employed as a structural ceramic ablator for use, e.g., in a thermal protection system (TPS) such as an ablative heat shield for a high speed atmospheric entry vehicle. This novel material is structurally stable, and can be easily tailored to accommodate specific mission requirements. Other applications of the inventive resin impregnated ceramic article and method for making the same include fire retardant structures, a reusable thermal protection system for the next generation Space Shuttle (X-2000), light weight structural components for the automotive and space industries, and water proofing for a TPS or external structures of a space vehicle.

2. Description of the Prior Art

Ablative polymers and polymeric composites serve an important function in aerospace technology. They protect aerodynamic surfaces, propulsion structures, and ground equipment from the degradative effects of very high temperatures or incident heating rates. This protective function is accomplished by a self regulating heat and mass transfer process known as ablation.

High density ablators having a density of about 1.1–1.9 g/cc (68.6–118 $lb_m/ft^3$) have been developed from various polymers such as epoxy, phenolic resins and different reinforced fibers or fillers such as asbestos fibers, graphite cloth, silica cloth, etc. by mixing, pressing and heating processes.

Existing low density ablators such as SLA-561 and AVCOAT (described in Bartlett, E. P. and Andersen, L. W., "An Evaluation of Ablation Mechanism for the Apollo Heat Shield Material", Aerotherm Report No. 68-38, Part II, Oct. 15, 1968) and MA-25S (described in Williams, S. D., "Thermophysical Properties Used for Ablation Analysis", LEC-13999, December 1979) are made of polymers, silica or phenolic microballons and are filled with chopped fibers and/or a honeycomb structure for reinforcement. These conventional ablators (developed and manufactured by Martin Marietta) have been successfully used in many planetary missions; for example, AVCOAT 5026-39HCG was used in a TPS for the Apollo capsules, SLA-561V was used on the Viking probe, and MA-25S is used on the nose cone of the Space Shuttle external fuel tank. The principal heat protection of these ablators is provided by the polymer and high level of carbon char formed as a residue during the ablation process. The heat dissipation process is due to heat absorption from depolymerization and gas pyrolysis, re-radiation from the char layer, and convective heat blockage from pyrolysis gas blowing in the boundary layer. These ablators have been extensively characterized and are flight verified.

During the early years of Space Shuttle heat shield development, a passive transpiration system was proposed. The system included a low density, high temperature ceramic matrix, such as silica, carbon, potassium titanate, or graphite, impregnated with coolants such as polyethylene, epoxy, acrylic, and phenolic. Of the different candidates, only the silica fiber matrix was studied in detail, mainly using LI-1500 material as described in R. P. Banas et al, "Lifting Entry Vehicle Thermal Protection Review" Lockhead Report No. 4-83-4-2 (1964). The silica fibrous matrix was totally immersed in the melted organic coolant, resulting in the coolant occupying all the void volume of the matrix. The ceramic ablators thus prepared had densities in the range of about 1.0–1.3 g/cc (60–80 $lb_m/ft^3$); 78% by weight as the organic coolant and 22% by weight as the silica fibers.

The passive transpiration system described above increases the heat rate capability of the ceramic substrate by addition of an organic coolant which functions as a transpirant. The disadvantage of this system is that the high density of the final product increases the overall thermal conductivity of the system. In addition, because the organic coolant entirely fills the void volume of ceramic the matrix, the organic coolant acts as an effective conduction path.

Conventional ablators are generally manufactured in a single process in which the polymers and other components, such as the microballons and the reinforced fibers, are uniformly mixed and allowed to cure. The final products have a uniform density which would be a disadvantage in economizing the vehicle's weight. One improvement in accordance with a preferred embodiment of this invention is to decrease the overall TPS weight by having a density gradient along the heat shield thickness, e.g., high density at the outer surface where needed and very low density near the vehicle structure. For conventional ablators, this modification would require special attachment schemes of different individual layers of the ablators that might be costly.

Silicone elastomeric ablators employing a polymer resin as the main structural support component for the entire heat shield have a fairly low density of from 0.2–0.4 g/cc (14–25 $lb_m/ft^3$); however, these materials have very low mechanical strength. After the decomposition process takes place, the polymeric residue is of very low strength and can be removed by low aerodynamic shear loads. Consequently, these materials are useful only for relatively low heating, low pressure environments of below about 1135 kW/m² (100 $BTU/s·ft^2$). This lack of self-support might cause a change in the vehicle's design shape that would ultimately affect the aerodynamic flow regime about the vehicle. Other ablators such as AVCOAT retain structural integrity with the help of a reinforcing honeycomb. However, the overall density of these materials is relatively high (0.5 g/cc–1.0 g/cm or 30–60 $lb_m/ft^3$), thereby resulting in high overall TPS weights.

The following patents relate to ceramic heat shields and ablative structures.

U.S. Pat. No. 4,713,275 relates to a ceramic tile for use in a thermal protection system, employing a ceramic cloth having additional ceramic material deposited therein. Dual tiles interlock with one another to form a single unit. The inner ceramic is designed to be of lighter weight.

U.S. Pat. No. 4,804,571 relates to a thermal protection system used for reentry vehicles or high speed aircraft including multiple refractory tiles of varying thickness defined by thermal requirements at the point of installation.

U.S. Pat. No. 4,031,059 relates to low-density ablators comprising a siloxane elastomer resin and a low-density filler material including ground cork, silica or glass microspheres and hollow phenolic resin microballons. The ablator may further contain carbon and/or silica fibers.

U.S. Pat. No. 4,100,322 relates to a high thermal capacity fiber-resin-carbon composite ablator having a polymer resin filler. The composite is prepared by impregnating a woven fabric of carbon or graphite yarn with a resin, curing the resin, pyrolyzing the impregnated fabric and re-impregnating the resulting fiber-porous carbon char composite with resin.

U.S. Pat. No. 4,605,594 relates to a ceramic article including a woven ceramic cloth having a non-porous core and a porous periphery prepared by treating with an acid. The porous periphery can be infiltrated by any of a number of desired materials such as a metal, a metal oxide, a catalyst and an elastomer. The articles of interest can be used as fiber optic elements, catalyst supports and heat resistant tiles for aerospace purposes.

U.S. Pat. No. 4,743,511 relates to a method of producing a refractory cermet article comprising a continuous ceramic phase and a discontinuous metal phase.

U.S. Pat. No. 5,112,545 relates to a composite preform prepared by first impregnating a braided, preform of inorganic filaments with a silicone resin solution. The impregnated preform is heated at a first temperature under pressure to cure the resin and then heated at a second higher temperature to convert the cured resin to silica solids that are dispersed between the strands of the preform. The rigidized preform is then infiltrated with an inorganic matrix such as a ceramic material.

U.S. Pat. No. 5,154,787 describes a method of manufacturing prepreg mats. Therein, a prepreg strand formed of inorganic fibers impregnated with a thermoplastic binder or a ceramic matrix powder is heated, cooled and compacted to fuse the same into a uniform, dense prepreg mat.

U.S. Pat. No. 3,533,813 relates to a low density, non-structural ceramic employing a porous ceramic support in combination with organic fillers. One step of the process described therein is the burning off of the organics to form pores within a ceramic. This reduces the mass of the composite, thereby reducing its density while maintaining inherent strength.

U.S. Pat. No. 4,255,197 relates to refractory products and a process for controlling porosity and density. Polymer substrate particles are wetted and mixed with ceramic particles to form a composite, and the composite is heated to burn out the polymer to thereby leave voids.

U.S. Pat. No. 4,828,774 relates to a process for preparing a porous ceramic refractory material for use in aerospace applications. The refractory material is made by firing a felt prepared from a mixture of a ceramic polymer solution and high strength fibers.

U.S. Pat. No. 5,006,492 relates to a low-density silicon nitride ceramic composition used to make flexible, low-density refractory products.

U.S. Pat. No. 5,135,691 relates to a low temperature sintering process for preparing smooth ceramic products. A porous ceramic is infiltrated with an inorganic polymer such as polyaluminoxane. Low temperature heat is applied, which results in a smooth, strong refractory.

U.S. Pat. No. 5,167,271 relates to a method for forming a dense ceramic-metal matrix article, including pyrolizing a ceramic powder-organic compact and infiltrating the resulting porous ceramic preform with molten metal.

U.S. Pat. No. 3,138,009 relates to a transpiration cooling system for use in cooling aircraft operating at hypersonic speeds. Specifically, a transpiration system is shown consisting of a porous skin through which a fluid is forced. Heat levels are reduced as the fluid is vaporized.

U.S. Pat. No. 3,213,166 relates to preparation of porous ceramics for thermal barrier or refractory applications using an organic air cell forming and sustaining compound.

U.S. Pat. No. 3,243,313 relates to a nose cone construction of layers of differing materials including ceramic and metallic materials which are either thermally matched or structurally compensated to prevent delamination.

U.S. Pat. No. 3,533,813 relates to a process for preparation of low-density, high strength ceramic tiles employing a combustible organic filler to provide pores in the final product.

U.S. Pat. No. 4,456,208 relates to a two-piece thermal tile having differing thermal and mechanical characteristics in the inner and outer layers of the tile.

SUMMARY OF THE INVENTION

Accordingly, a first object of this invention is to provide a low-density resin impregnated ceramic article and method for making the same having increased mechanical strength and enhanced thermal performance.

A second object of this invention is to provide a low-density, passive transpiration led resin impregnated ceramic article which can survive severe heating environments.

A third object of this invention is to provide a low-density resin impregnated ceramic article having a large void volume fraction to allow for enhanced gas percolation, prevent internal material cracking due to pyrolysis gas build-up, and maintain low thermal conductivity.

A fourth object of this invention is to provide a low-density resin impregnated ceramic article as a component of a heat shield forming a well adhered char layer at its surface, having enhanced surface toughness and a sealed water-proof surface, and where the ceramic portion thereof remains structurally stable to provide support for the entire heat shield.

A fifth object of this invention is to provide a low-density resin impregnated ceramic article, wherein the resin is uniformly distributed throughout the ceramic article.

A sixth object of this invention is to provide a low-density resin impregnated ceramic article, wherein the resin is distributed so as to provide a density gradient along at least one direction of the ceramic article.

Other objects of this invention will become apparent in the following description and Examples.

The present inventors have discovered that the above objectives are achieved by a low-density resin impregnated ceramic article comprising a matrix of ceramic fibers and an organic resin film coating said fibers, wherein the resin impregnated the ceramic article has an average density of from 0.15 to 0.40 g/cc.

The present inventors have also discovered that the above first through fifth objectives are achieved by a method for making a uniform density resin impregnated ceramic article comprising the steps of (a) providing a matrix of ceramic fibers; (b) immersing the matrix of ceramic fibers in a solution of a low boiling solvent and a thermoplastic resin having a molecular weight of from $10^5$ to $10^7$, said solution have a viscosity of from 20,000–100,000 cps; and (c) removing the solvent from the matrix of ceramic fibers by evaporation at atmospheric pressure to form a thermoplastic resin film on the ceramic fibers.

The present inventors have also discovered that the above first through fifth objectives are achieved by a method for making a uniform density resin impregnated ceramic article comprising the steps of (a) providing a matrix of ceramic fibers; (b) immersing the matrix of ceramic fibers in a solution of a solvent and an organic thermosetting resin; (c) partially curing the thermosetting resin to form a gel; (d) removing the solvent from the matrix of ceramic fibers; and (e) further curing the thermosetting resin within the matrix of ceramic fibers to form a cured film of the thermosetting resin on the ceramic fibers.

The present inventors have also discovered that the above first through fourth and sixth objectives are achieved by a method for making a non-uniform resin impregnated ceramic article where the resin is distributed so as to provide a density gradient along at least one direction of the ceramic article, comprising the steps of (a) providing a matrix of ceramic fibers; (b) immersing the matrix of ceramic fibers in a solution of a solvent and a thermoplastic resin having a molecular weight of from $10^3$ to less than $10^5$; and (c) removing the solvent from the matrix of ceramic fibers by one or both of heating at a temperature of from 30° to 200° C. and applying a vacuum to form a thermoplastic resin film on the ceramic fibers.

The present inventors have also discovered that the above first through fourth and sixth objectives are achieved by a method for making a non-uniform resin impregnated ceramic article wherein the resin is distributed so as to provide a density gradient along at least one direction of the ceramic article, comprising the steps of (a) providing a matrix of ceramic fibers; (b) immersing the matrix of ceramic fibers in a solution of a solvent and an organic thermosetting resin; (c) removing the solvent from the matrix of ceramic fibers by applying one or both of heat and vacuum without allowing the resin solution to gel; and (d) curing the thermosetting resin within the matrix of ceramic fibers to form a cured film of the thermosetting resin on the ceramic fibers.

This invention offers a unique family of light-weight ablators that are structurally stable when exposed to very high heating environments (e.g., up to about 3500° C. or 16000 kW/m$^2$). Because of its low density, the low-density ceramic ablator CA of this invention can minimize the total TPS weight of space vehicles and thus allow for greater scientific payloads. Prototype samples of this invention were tested in an aeroconnective environment at a range of heat fluxes from 1135–16353 kW/m$^2$ (100–1440 BTU/s·ft$^2$) and stagnation pressures of from 0.05 to 0.333 Atm. The test results showed that at low flux levels of <2271 kW/m$^2$ (<200 BTU/s·ft$^2$), LCA's prepared from a high emittance silica substrate and a high blowing rate infiltrant are most mass efficient. On the other hand, at high flux levels of >4543 kW/m$^2$ (>400 BTU/s·ft$^2$), carbon substrate LCA's outperformed conventional ablators in terms of both effective heat of ablation and recession rate. LCA test samples of this invention have been produced with low densities of <0.25 g/cc (<16 lb$_m$/ft$^3$) which, in some cases, is a factor of two less than that of conventional materials. Unlike the elastomeric ablators such as SLA-561 and MA-25S, infiltration of a resin into a ceramic matrix imparts to the LCA improved mechanical strength without increasing its thermal conductivity. Moreover, after the ablation process, i.e., polymer decomposition and gas pyrolysis, the LCA's of this invention remain structurally stable and thus can act as a protective insulation for space vehicles during moderate heating entry.

Similar to conventional ablators, the heat protection provided by the LCA of this invention is due to heat absorption of depolymerization, pyrolysis gas blowing in the boundary layer, and re-radiation of the char layer at the surface. The main difference between conventional ablators and the LCA of this invention is the level of contributions of each of the above processes to provide over a enhanced performance. The depolymerization and gas pyrolysis process for both systems are the same since organic resins have similar decomposition temperatures. In addition, the LCA of this invention exhibits other heat dissipation mechanisms such as heat absorption for the vaporization of substrates, and heat rejection by re-radiation from the substrate surface. At moderate heating conditions (1000–2500 kW/m$^2$), the surface of the LCA of this invention is comprised not only of a char layer formed by infiltrant decomposition, but also the coalescence of ceramic fibers. The char is then built up on this fibrous surface to form a stronger char layer than that of conventional ablators to thereby significantly reduce the surface recession rate.

Also at moderate heating conditions, during the pyrolysis process, the polymer resin undergoes a chemical reaction to form new charred products at the LCA surface. The charred surface of some LCA systems comprises carbon and silicon carbide which is protected by a thin layer of silicon oxide. This glassy layer converts the LCA surface from a catalytic to a semi-non-catalytic surface and thus significantly reduces the convective heating rate at the LCA surface. This charred surface also has a high emissivity that radiates most absorbed energy at the surface. The combination of reduced convective heating rate and re-radiation results in almost no recession and mass loss of the LCA of this invention. At high heating conditions (4300–16000 kW/m$^2$), the LCA of this invention dissipates the heat almost entirely by reradiation and micro spallation or evaporation of the substrate. The combination of resin having a high char yield and a substrate having a high melting point enables the LCA of this invention to efficiently re-radiate heat at the surface without undergoing melting or significant mechanical failure.

In addition, since the void volume fraction of the LCA of this invention is fairly large, the percolation of pyrolysis gas within the ceramic matrix occurs more freely so that pyrolysis gas cracking of the polymers can readily occur.

For details regarding incorporation of a resin impregnated ceramic ablator of this invention into a thermal protection system (TPS) such as a heat shield, reference may be made to Tran et al "Thermal Response and Ablation Characteristics of Lightweight Ceramic Ablators" AIAA 93-2790, July 1993.

It is to be understood that both the foregoing general description and the following detailed description are exemplary and explanatory but are not to be construed as being restrictive of the invention.

DETAILED DESCRIPTION OF THE INVENTION

Figure 1:
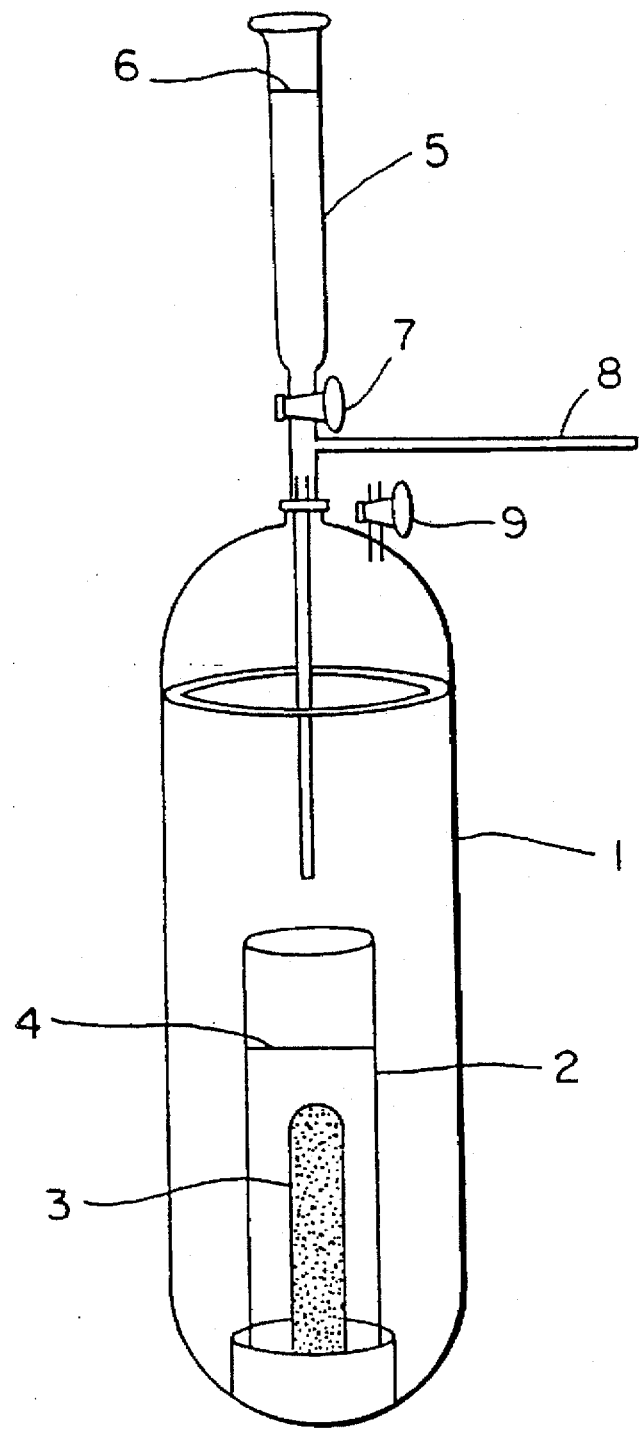
FIG. 1 shows an infiltration apparatus for making a low-density resin impregnated ceramic article in accordance with the method of the present invention.

The matrix of ceramic fibers (also referred to herein as "fibrous ceramic substrate" or "ceramic substrate") for use in this invention includes well developed, flight certified reusable surface insulations (RSI). These materials include silica and mixed oxide materials developed for Space Shuttle, with densities (prior to infiltrating with an organic resin) of 0.10–0.35 g/cc (6–22 lb$_m$/ft$^3$), and carbon fiber materials used for space craft nuclear power supply insulation with densities of 0.15–0.20 g/cc (9–12 lb$_m$/ft$^3$).

The term "matrix" of ceramic fibers (including carbon fibers) as employed herein means a mechanically sound framework that is filled with air molecules and rigidized by ceramic/carbon fibers.

The term "structural" ceramic ablator as employed herein means a low density ablative material that has significant mechanical strength and does not require any additional material or mechanical attachment scheme to support a heat shield comprising the same.

The fibrous ceramic substrate for use in this invention may be in the form of, e.g., a tile, fabric, felt, tow, woven yarn or interlock fabric.

The fibrous ceramic substrate generally has a thickness of from 1 to 200 cm, a length of from 1 to 200 cm and a width of from 1 to 200 cm; however, the dimensions are not particularly limited and may be tailored to specific needs.

The ceramic fibers constituting the fibrous ceramic substrate of this invention include, for example, silicon carbide fibers, aluminum oxide fibers, aluminoborosilicate (ABS) fibers, silicon dioxide fibers, carbon fibers, zirconia fibers, etc. The fiber dimensions are not particularly limited, although a fiber diameter of from 3 to 15 µm and an aspect ratio of the fiber of from $3.5 \times 10^{-5}$ to $4.3 \times 10^{-5}$ can generally be employed.

Examples of useful ceramic fibers constituting the fibrous ceramic substrate of this invention include Zircar zirconium dioxide fibers (or felt); silicon nitride fibers, Nicalon "Ceramic Grade" silicon carbide fibers manufactured by Nippon Carbon of Japan; Tyranno silicon carbide fibers made by Ube Industries of Japan; SCS-2,6,8 silicon carbide on carbon filaments made by Textron; Saphikon aluminum oxide fibers; Nextel Z11 zirconium silicate fibers made by 3M; Saffil aluminum silicate fibers made by I.C.I.; Altex aluminum silicate fibers made by Sumitomo; Almax aluminum oxide fibers made by Mitsui Mining; FP aluminum oxide fibers made by Du Pont; PRD-166 zirconium albuminate fibers made by Du Pont; HPZ on tungsten filaments made by British Petroleum; Fiberamic silicon carbide fibers made by Dow Corning; Sigma silicon carbide fibers made by Rhone-Poulenc; boron nitride fibers made by Electroceramics; and silicon carbide and silicon nitride whiskers.

Other useful fibers include silicon dioxide fibers, at least 99.6% pure, manufactured by Johns Manville and commercially available as Microquartz 108 fibers; Nextel 312 (an ABS fiber) produced by the 3M Company containing 62±2% aluminum oxide, 14±2% boron oxide, and 24±2% silicon dioxide; Nextel 440 and 480 ABS fibers made by 3M; and FRCI (U.S. Pat. No. 4,148,962) made from ABS fibers ranging in diameters from 3 to 12 µm.

Preferred ceramic fibers constituting the fibrous ceramic substrate of this invention include silicon dioxide (silica), zirconia, boria, hafnia, silicon carbide, carbon and aluminum oxide fibers. Different kinds of fibers may be used in combination to prepare the ceramic substrate. A preferred combination comprises silica and carbon fibers.

The fibrous ceramic substrate of this invention may be prepared from the above described fibers, e.g., in accordance with the technique described in U.S. Pat. No. 4,148,962 to Leiser et al and U.S. Pat. No. 3,952,083 to Fletcher et al incorporated herein by reference.

The fibrous ceramic substrate (prior to infiltrating with an organic resin) for use in this invention has a void volume fraction of from 70 to 96%, and preferably from 90 to 96%.

The term "void volume fraction" as used herein means the ratio of the volume of air space between fibers within the substrate to the total volume of the substrate.

The fibrous ceramic substrate (prior to infiltrating with an organic resin) has a density of from about 0.10 to about 0.40 g/cc, and preferably of from 0.13 g/cc to 0.23 g/cc.

Specific examples of fibrous ceramic substrates for use in this invention include the following.

1. LI-900 made by Lockheed (Lockheed Insulation-900), having a density of 0.12–0.15 g/cc (7.5–14 $lb_m/ft^3$), and containing $SiO_2$ fibers only. There are 93–95% voids in this substrate. For details of LI-900, reference may be made to Beasley et al "Fabrication and Improvement of LMSC's All-Silica RSI" Tech. Report NASA TMX-2719 (November 1972).

2. AETB-20 (Alumina Enhanced Thermal Barrier) developed by NASA Ames Research Center, Moffett Field, Calif., having a density of 0.13–0.15 g/cc (8–9 $lb_m/ft^3$), and containing 12–15 wt % Nextel® fibers, 20 wt % alumina fibers and 62–65 wt % silica fibers. There are 94–95% voids in this substrate. For details of AETB-20, reference may be made to D. B. Leiser, M. Smith and D. A. Stewart, "Option for Improving Rigidized Ceramic Heat Shield", Ceramic Eng. & Science Proceeding, Vol. 6, No. 7–8, August 1985 or U.S. Pat. No. 4,148,962 to Leiser et al.

3. AETB-50 (Alumina Enhanced Thermal Barrier) developed by NASA Ames Research Center, having a density of 0.13–0.15 g/cc (8–9 $lb_m/ft^3$), and containing 15 wt % Nextel® fibers, 50 wt % alumina fibers and 35 wt % silica fibers. There are 95–96% voids in this substrate. For details of AETB-50, reference may be made to D. B. Leiser, M. Smith and D. A. Stewart, "Option for Improving Rigidized Ceramic Heat Shield", Ceramic Eng. & Science Proceeding, Vol. 6, No. 7–8, August 1985 or U.S. Pat. No. 4,148,962 to Leiser et al.

4. AIM-10 (AMES Insulation Material developed by NASA AMES Research Center, having density of 0.15–0.17 g/cc (9–10 $lb_m/ft^3$) and containing 98.5% ultra microquartz fibers and 1.5% silicon carbide. There are 92–94% voids in this substrate. This substrate was developed using a processing technique similar to that described in U.S. Pat. No. 3,952,083 to Fletcher et al.

5. Light weight rigid carbon tile, made by Fiber Materials Inc., commercially available as Fiberform®, having a density of 0.15–0.22 g/cc (9–14 $lb_m/ft^3$), and containing carbon fibers only. There are 88–93% voids in this substrate. For details, reference may be made to U.S. Pat. No. 3,577,344 (May 1971), U.S. Pat. No. 3,393,204 (February 1974) and U.S. Pat. No. 4,152,482 (March 1978).

6. AIM-8 (AMES Insulation Material) developed by NASA AMES Research Center, having a density of 0.12–0.14 g/cc (7.4–8.6 $lb_m/ft^3$) and containing 98.5% microquartz fibers and 1.5% silicon carbide. There are 94–95% voids in this substrate. This substrate was developed using a processing technique similar to that described in U.S. Pat. No. 3,952,083 to Fletcher et al.

The organic resin infiltrant for use in this invention includes thermoplastic resins and thermosetting resins. As employed herein, the term "thermoplastic resin" means a high molecular weight linear polymer, and the term "thermosetting resin" means a polymer resin that can be crosslinked by a curing agent and/or heat. Specific examples thereof include the following.

1. PMMA (polymethylmethacrylate) thermoplastic resin having 0% char yield at above 550° C. in an inert atmosphere (e.g., nitrogen environment), commercially available as plexiglass and made by Rohm and Hass.

2. PBI (polybenzimidazole) resin, a thermoplastic polymer with 70% char yield in an inert atmosphere at a high temperature (>600° C.), commercially available as U-60 and made by Hoechst Celanese.

3. Novolak epoxy thermosetting resin having 20–30% char yield at high temperature above 600° C. in an inert atmosphere, commercially available as DEN 438 and made by Dow Chemical Co.

4. Phenolic thermosetting resin with 55–60% char yield at high temperature above 650° C. in an inert atmosphere, commercially available as SC1008 and made by Monsanto.

5. Polyarylacetylene thermosetting resin with 70–80% char yield at high temperature above 700° C. in an inert atmosphere, commercially available as H Resin and made by Hercules.

6. Silicone thermosetting resin with 60% char yield at high temperature above 600° C. in an inert atmosphere, commercially available as RTV 655 and made by General Electric.

7. Silicone thermosetting resin commercially available as RTV 577 and made by General Electric.

The term "phenolic" thermosetting resin as employed herein means a thermosetting resin obtained by condensation of phenol or a substituted phenol with an aldehyde such as formaldehyde, acetaldehyde and furfural.

Novolak epoxy is an epoxy resin made by the reaction of epichlorohydrin with a novolak resin (phenol-formaldehyde). This resin has a repeating epoxide structure which offers better resistance to is high temperatures than epichlorohydrin-bisphenol A type epoxy resins.

The term "silicone" resin as employed herein means a polymer containing —$Si(R_2)O$— groups in which silicon takes the place of carbon in an organic synthetic resin.

The term "char yield" as employed herein means percentage of residue after heat treatment in an inert environment.

The low-density resin impregnated ceramic article of the invention can be prepared as follows. First, a solution containing an organic resin infiltrant is prepared. Then, a fibrous ceramic substrate is immersed into the solution. The excess solution is removed after infiltration. For the case of a thermoplastic resin, the solvent is removed from the infiltrated ceramic substrate to thereby leave the desired amount of resin infiltrant. For the case of a thermosetting resin, the infiltrated ceramic substrate is first partially cured to form a gel, in one embodiment of this invention, to provide a uniform distribution of the resin within the fibrous matrix of the ceramic substrate.

Alternatively, the solvent in the infiltrated ceramic substrate is rapidly removed (without first forming a gel) for a thermosetting resin in a second embodiment of this invention, to provide a density gradient of the resin along at least one direction (e.g., the thickness direction between an outer surface and a center portion) of the ceramic substrate (non-uniform sample). For a thermoplastic resin, a low molecular weight resin is used as an infiltrant, and the solvent is rapidly removed to migrate the resin from the center to the surface of the ceramic substrate (non-uniform sample). Thus, the surface of the substrate has a higher density than the center of the substrate.

With the above procedures, the fibers in the ceramic matrix are, in effect, coated with a thin film of resin. The final product has a very low density with retention of a large void volume fraction (i.e., the ceramic substrate is only partially impregnated with an organic resin), good mechanical strength and good insulation properties.

The low-density resin impregnated ceramic article of this invention comprising a matrix of ceramic fibers, which fibers are coated with an organic resin film, has an average density of from 0.15 g/cc, to 0.4 g/cc and preferably from 0.17 g/cc 0.3 g/cc, and an average void volume fraction of from 70% to 94%, preferably from 85% to 93%, and more preferably from 88 to 92%. The organic resin film which coats the fibers constituting the ceramic matrix generally has a coating thickness of from 0.1 μm to 200 μm, and preferably from 1.0 μm to 50 μm. Furthermore, the resin impregnated ceramic article contains ceramic fibers in an average amount of from 20 to 80 wt % and preferably from 40 to 70 wt %, and an organic resin in an average amount of from 20 to 80 wt % and preferably from 30 to 60 wt %.

For a uniform, low-density resin impregnated ceramic article of this invention, the difference in resin content between the center and outside portions thereof is within ±10 wt %, preferably within ±5 wt % and more preferably within ±3 wt % of the average resin content (in wt %). Furthermore, the variation in density within a uniform, low-density resin impregnated ceramic article of this invention does not exceed ±10%, preferably does not exceed ±5% and more preferably does not exceed ±3% of the average density.

For a non-uniform low-density resin impregnated ceramic article of this invention, the density gradient Δρ/r, or change in density (g/cc) per unit distance (cm) along at least one direction thereof (e.g., the thickness direction), is generally from 0.05 to 0.8 per cm and preferably from 0.05 to 0.5 per cm. Furthermore, the change in resin content (in wt %) per unit distance (cm) along at least one direction of the non-uniform resin impregnated ceramic article of this invention is generally from 10 to 160wt % per cm and preferably from 15 to 105 wt % per cm.

When incorporated into a thermal protection system, the non-uniform, low-density resin impregnated ceramic article of this invention having a density gradient along at least one direction thereof advantageously has a high density at an outer surface and low density near the vehicle structure (an opposing surface). In this embodiment, the resin impregnated ceramic article is cut in half to provide a high density surface and an opposing low density surface taken from a center portion of the ceramic article. Generally, the density at the outer surface is from 0.27 to 0.82 g/cc and preferably from 0.30 to 0.48 g/cc, and the density at the vehicle main structure (i.e., the opposing surface taken from a center portion of the resin impregnated ceramic article) is generally from 0.14 to 0.25 g/cc and preferably from 0.14 to 0.18g/cc.

The use of a very-high temperature capability ceramic substrate with good insulative properties and high mechanical strength, in combination with a high blowing and/or high char yield infiltrant, provides protection against very severe thermal environments with substantially reduced weight compared to conventional ablators.

The method of this invention is described in further detail with respect to use of a thermoplastic resin or thermosetting resin as the organic resin infiltrant as follows.

A. Thermoplastic Resins

To make a sample containing a uniformly distributed thermoplastic resin within a low-density fibrous ceramic substrate, a viscous solution containing a high molecular weight resin (calculated concentration for the desired density) having a molecular weight of from $10^5$ to $10^7$ and preferably from $10^6$ to $10^7$ is employed as an infiltrant. In this regard, the volume and density of the ceramic substrate is calculated from weight, length and diameter measurements, which measurements are used to determine the amount of resin and solvent needed for infiltration. The solvent should have a low boiling point, and the resin must be completely dissolved in the solvent. The viscosity of the thus prepared solution is preferably in the range of from 20,000–100,000 cps, more preferably from 30,000–70,000 cps by using a mixture of different molecular weight thermoplastics. If the viscosity of the solution is too high, the resin solution is not easily infiltrated into the center of the sample. If the viscosity of the solution is too low, the resin is carried out with the solvent upon evaporation, causing the sample to be non-uniform.

The low-density fibrous ceramic substrate is evacuated generally at a vacuum of $\leq 1$ Torr and infiltrated with the resin solution for about 0.5 to 24 hrs. The type of vacuum pump used to evacuate the ceramic substrate (which ceramic substrate is typically placed within a vacuum container) is not particularly limited. The solvent is removed from the infiltrated ceramic substrate, e.g., by evaporation at room temperature (e.g., about 25° C.) and atmospheric pressure (about one atmosphere) or at a higher temperature of up to about 200° C. generally for about 24 to 36 hrs. depending on the type of solvent employed until a stable weight is achieved. The uniformity of the sample is determined by measuring the resin content of the center and an outside portion of the sample.

An alternate method for making a uniform thermoplastic sample comprises infiltrating an evacuated low-density fibrous ceramic substrate with resin solution, and then dipping the sample into a larger quantity of a non-solvent for the thermoplastic resin generally for about 2 to 24 hrs. to precipitate thermoplastic resin in place throughout the sample. This process is especially useful for resins having a molecular weight of from $10^4$ to $10^5$, especially if the resin has low solubility at room temperature but hap high solubility at higher temperatures (e.g., PBI). The term "non-solvent" as employed herein means that the thermoplastic resin is soluble therein in an amount not exceeding 0.5 g/l at a temperature of 20°–30° C. Useful non-solvents for precipitating thermoplastic resin in place throughout the ceramic substrate can be, for example, water, methanol, ethanol and isopropanol.

Excess solvent (and/or non-solvent) is then removed, e.g., by evaporation at room temperature or at a higher temperature (of up to 150° C.) generally for about 2 to 24 hrs. depending on the solvent used until a stable weight is achieved.

To make a non-uniform sample where a thermoplastic resin is distributed so as to provide a density gradient along the thickness of the ceramic substrate, a lower molecular weight resin having a molecular weight of from $10^3$ to less than $10^5$ and preferably from $10^4$ to less than $10^5$ is dissolved in a low boiling point solvent to obtain the desired solution concentration. The viscosity of the thus prepared solution is preferably in the range of from 1 to 1000 cps, more preferably from 10 to $10^3$ cps. After infiltration, the solvent is removed at a faster rate (than the case for a uniform sample) either by vacuum suction 0.1 to 10 Torr and/or at a higher temperature of from 30° to 200° C., preferably 30° to 150° C., to migrate the resin from the center to the surface of the sample.

The low boiling solvent for use in preparing a solution of the thermoplastic resin infiltrant has a boiling point of from 50° to 200° C. Useful low boiling solvents include acetone, methyl ethyl ketone (MEK), toluene, dimethyl sulfoxide, (DMSO) and mixtures thereof. The concentration of thermoplastic resin in the infiltrating solution is generally from 7 wt % to 12 wt %.

Useful thermoplastic resins include PMMA, PBI, and polystyrene. Preferred among these thermoplastic resins are PMMA and PBI.

The term "molecular weight" as used herein means number average molecular weight.

B. Thermosetting Resins

Uncured thermosetting resin dissolved in a solvent has a very low viscosity. In accordance with the method of this invention, the fibrous ceramic substrate is infiltrated with resin solution. In order to make a uniform sample, the infiltrated samples are partially cured (as submerged in the resin solution) to form a gel. This step is followed by solvent removal and curing of the resin to complete cross-linking of the thermosetting resin.

Thermosetting resin is completely dissolved in a high boiling solvent with the desired concentration and used as the impregnant to infiltrate the ceramic substrate. After the substrate is infiltrated with the solution for about 0.5 to 24 hrs. under a vacuum of about $\leq 1$ Torr, the impregnated sample is heated at a suitable temperature or microwaved to a temperature (at one atmosphere or higher pressure) below the boiling point of the solvent in a closed container (or in an autoclave near the boiling temperature of the solvent) until the thermosetting resin gels. The excess resin is removed and the solvent is removed by heating under vacuum. The sample is then further cured to completion according to the normal curing schedule of the resin.

The high boiling solvent has a boiling point of from 100° to 250° C. Useful high boiling solvents include methylisobutylketone (MIBK), ethylene glycol, dimethyl sulfoxide (DMSO), dimethyl formamide (DMF), dimethyl acetate (DMAc), xylene and toluene. The solvent selected depends on solubility and the gel temperature of the resin therein. The concentration of thermosetting resin in the solution is generally from 7 wt % to 12 wt %. The gelling temperature and time varies depending on the nature of the thermosetting resin, but generally is from 100° to 250° C. for a duration of from 1 to 24 hrs. After the sample is gelled, the solvent is removed under vacuum ($\leq 100$ Torr) at 100° C.–200° C. depending on the solvent employed. Generally, several heating cycles are needed to complete the curing process depending on the resin employed.

To make a non-uniform sample where a thermosetting resin is distributed so as to provide a density gradient along the thickness of the ceramic substrate, the solvent is removed at 20° C.–200° C. with or without vacuum depending on the solvent employed without first forming an intermediate gel state. After removing the solvent from the impregnated substrate, the sample is then cured according to the normal curing schedule of the resin.

Useful thermosetting resins include epoxy resin, phenolic resin, polyarylacetylene resin, silicone resin, polyphenylene resin and other resins. Among these, silicone resin and phenolic resin are preferred.

FIG. 1 shows an infiltration apparatus for making a low-density resin impregnated ceramic article in accordance with the method of the present invention, including vacuum container 1, beaker 2 containing ceramic substrate 3 and resin solution 4, buret 5 which holds resin solution 6 and including valve 7 for controlling solution flow to ceramic substrate 3, stem 8 for connection to a vacuum source (not shown) and valve 9 for venting the vacuum container to atmospheric pressure. In accordance with the method of the present invention, buret 5 is initially filled with resin solution 6 and beaker 2 holds ceramic substrate 3 but does not contain resin solution. Valves 7 and 9 are closed. Stem 8 is connected to a vacuum source to evacuate vacuum container 1 and ceramic substrate 3. Valve 7 is opened to deliver resin solution to beaker 2 so that ceramic substrate 3 is entirely immersed in resin solution 4. Valve 7 is then closed. Following infiltration, a valve (not shown) is closed to disconnect the vacuum source, and valve 9 is opened to vent vacuum container 1. The infiltrated ceramic substrate 3 is removed from vacuum container 1 and further processed as described above depending on the resin type and desired uniformity profile of the sample.

Details with respect to the present invention will be further described by way of the following Examples to illustrate aspects of this invention, which Examples are not intended to limit the scope or applicability of this invention.

EXAMPLES

1. Preparation of Partially Densified Uniform Density PMMA Samples a. The substrates (LI-900, AETB-20, AETB-50 and carbon tile) as indicated in Table 1 below having a size of about 40–500 cc were each placed in a container under vacuum. A PMMA solution having a viscosity of $4.0 \times 10^4$ to $5.0 \times 10^4$ cps and comprising 50 g of very high molecular weight ($Mn > 10^6$) PMMA and 17 g of medium molecular weight ($Mn = 10^5$) PMMA dissolved in 740 ml of acetone was added to the container to cover the substrate (Mn means number average molecular weight). After infiltrating for about 1–24 hrs., the infiltrated ceramic substrates were each removed from the solution and excess PMMA was removed using a cloth. The samples were then dried in air to remove solvent for about 24 hrs. The PMMA resin was uniformly distributed throughout each of the samples as determined by thermogravimetric analysis (TGA) of the center and surface of the respective samples. The technique of thermogravimetric analysis (which provides the decomposition temperature and weight loss of a material as a function of temperature at a constant heating rate) is well known in the art and is described, for example, in the TA Instrument Co. thermogravimetric analyze instruction manual. The sample surfaces contained 39–42 wt % PMMA resin and the centers contained 38–40 wt % PMMA resin. The samples thus prepared were further evaluated with respect to beginning and final weight, beginning and final density and average resin content, the results of which are set forth in Table 1 below.

b. The substrates (LI-900, AETB-20, AETB-50 and carbon tile) as indicated in Table 1 below having a size of about 10–250 cc were each placed in a container under vacuum. A PMMA solution as in part a. above was added to the container to cover the substrate. After infiltrating for about 2–24 hrs., the infiltrated ceramic substrates were each removed from the solution. The excess solution was then removed and the samples were dipped for about 1–24 hrs. in excess ethanol and/or methanol (sufficient to cover the samples) to thereby precipitate the PMMA polymer. The samples were then dried in air for about 24 hrs. The samples thus prepared had a uniform resin content as determined by TGA. The sample surfaces contained 38–40 wt % PMMA resin and the centers contained 37–39 wt % PMMA resin.

2. Preparation of Partially Densified Uniform Density PBI Samples

Polybenzimidazole (PBI) obtained from Hoechst Celanese (U-60 resin) and having a molecular weight of $10^4$ was dissolved in DMSO at 100°–150° C. (9 g of resin in 90 ml of solvent). LI-900 and carbon tile as indicated in Table 1 below having a size of about 40–50 cc were infiltrated with hot PBI resin/DMSO solution (viscosity of 5–100 cps) under vacuum. The samples were then cooled to room temperature and most of the PBI precipitated after cooling. Next, the samples were removed from the container and excess resin was wiped off with a cloth. The samples were then immersed overnight in excess water to remove DMSO. The solvents (water/DMSO) remaining in the samples were then removed by evaporation at 150°–250° C. under vacuum. The samples were then heated at 400° C. in nitrogen for 10–60 mins. to remove trace amounts of DMSO and to sinter the resin. Thermogravimetric analysis (TGA) of the infiltrated samples in nitrogen and in air indicated that the samples contained slightly less resin in the center (39.3–39.7%) than at the surface (41.4–42%).

3. Preparation of Partially Densified Uniform Density Epoxy Samples

An epoxy mixture containing the following ingredients was prepared:
   10 g Dow epoxy resin-DEN 438
   8.5 g Nadic methyl anhydride
   0.15 g DMP-30 (2,4,6-tris(dimethylamino methyl) phenol, available from Aldrich Chemical Co.).

The epoxy mixture was dissolved in methylisobutyl ketone (MIBK) in an amount of 5 g per 40 ml of solvent. The substrates as indicated in Table 1 below were each evacuated, and epoxy solution was added to cover the substrates. After impregnation for 1–6 hrs., the sample-solution system was heated at 80° to 90° C. for about 24–48 hrs. until the resin gelled in a closed system. The excess gelled resin was removed using a cloth, and remaining solvent in the respective samples was removed under vacuum at a temperature near the boiling point of the solvent for about 8–24 hrs. The samples were cured at 100° C. for 8 hrs. and then postcured at 200° C. for 16 hrs. The resin was uniformly distributed within the respective substrates as indicated by TGA of the center and surface of each sample. The sample centers contained 32–34 wt % resin and the sample surfaces contained 35–37 wt % resin for one inch cube samples.

4. Preparation of Partially Densified Uniform Density Phenolic Samples a. A novolak phenolic resin (commercially available as SC1008 and made by Monsanto) containing 5–15 wt % hexamethylenetetramine was dissolved in ethylene glycol (4–6 g of resin/40 ml of solvent). The substrates as indicated in Table 1 below having a size of about 5.1 cm cube (2 inch cube) were each impregnated with the phenolic solution under vacuum for 0.5–1 hrs., and the container was then heated at 130°–150° C. until the resin became partially cured (1–3 hrs.) to form a gel in this closed system. The excess resin gel was removed and the substrates were heated at 135°–180° C. under vacuum for about 8–24 hrs. to remove excess solvent. The samples were them cured at 180°–220° C. for 1–4 hrs. The resin distribution in the samples thus prepared was determined by TGA. The sample centers contained 34–37 wt % resin and the sample surfaces contained 35–39 wt % resin.

b. The substrates indicated in Table 1 below having a size of about 2.54 cm diameter×10.16 cm in length were each impregnated with a phenolic solution using the same procedure as in 4a. under vacuum in a glass container. The container was placed in a microwave oven (500 watts, 60 MHz) and heated 5–10 times in short durations of about 10 seconds each to gel the resin without evaporating the solvent. The excess resin gel was removed and the substrates were heated to 135°–180° C. under vacuum for about 8–24 hrs. to remove excess solvent. The samples were then cured at 180°–220° C. for 1–4 hrs. The resin distribution within the samples as measured by TGA was similar to that of the samples prepared in 3a.

5. Preparation of Partially Densified Uniform Density Polyarylacetylene Samples Polyarylacetylene prepolymer resin (described above) was dissolved in a high boiling solvent (DMSO, DMF or DMAc) in an amount of 9 g/80 ml of solvent. The substrates as indicated in Table 1 below having a size of about 2.5 cm cube (1 inch cube) were impregnated with the resin solution under vacuum and then heated at 160° C. overnight or microwaved to gel the resin. The excess resin gel on the surface of the samples was removed, and the samples were then heated to 135°–180° C. under vacuum for about 8–24 hrs. to remove excess solvent. The samples were then cured at 180°–220° C. for 1–4 hrs. The resin distribution in the substrates was determined by TGA. The sample centers contained 37–39 wt % resin and the sample surfaces contained 39–41 wt %.

6. Preparation of Partially Densified Silicone Samples Having Uniform Density Silicone resin from General Electric (10 g of RTV 655 A and 1 g of RTV 655B curing agent) was dissolved in 105 ml of toluene solvent. The substrates as indicated in Table 1 below having a size of about 2.5 cm cube (1 inch cube) were impregnated with the resin solution under vacuum. The samples were soaked in the resin solution in a closed container at 1 atmosphere or higher pressure and the system was heated to 100° C. for 1 to 3 hrs. to gel the resin. The excess resin gel on the surfaces of the samples were removed, and the solvent was then evaporated at 20°–100° C. under vacuum ($\leq 100$ Torr) until there was no further change in the sample weight (about 1–8 hrs.). The samples thus prepared were then heated at 100° C. for 1 hr. to ensure that the resin was fully cured. The resin was uniformly distributed within the respective substrates as indicated by TGA of the surface and center of each sample. The sample centers contained 35–39 wt % resin and the sample surfaces contained 35–40 wt % resin.

Some of the samples thus prepared as indicated in Table 2 below were further evaluated with respect to tensile strength, tensile modulus and compression strength. These measurements were carried out using a mechanical tester made by INSTRON.

TABLE 2

TENSILE STRENGTH OF SAMPLES BEFORE AND AFTER INFILTRATION

| Sample | Tensile Strength (psi) | Tensile Modulus (ksi) | Compression Strength (psi) |
|---|---|---|---|
| Carbon Substrate | 27.19 | — | — |
| AETB-20 | 63 | 16 | 112 |
| PMMA-AETB-20 | 242 | 33 | 267 |
| Phenolic-AETB-20 | 177 | 41 | 210 |
| Epoxy-AETB-20 | — | — | 251 |
| Silicone-AETB-20 | 99.82 | | |
| Phenolic-Carbon | 26.67 | — | — |

Test articles were prepared to evaluate the thermal performance and ablation characteristics of the new low-density resin impregnated ceramic ablator of this invention in the NASA Ames Arc Jet facility. This facility (described in AIAA-92-5044, December 1992) can simulate earth re-entry conditions experienced by a space vehicle. Table 3 below shows a comparison of the crucial properties of the LCA of this invention (prepared as described in Example 6 above) and a prior art AVCOAT 5026-39 ablator for the Apollo capsules (comprising phenolic microballons, novolak resin and phenolic honeycomb cells) in various re-entry trajectories.

The results of Table 3 show that the LCA of this invention has a much lower total recession and mass loss as compared to a prior art AVCOAT 5026-39 at the same testing conditions. It also shows that the LCA of this invention is more mass efficient than AVCOAT 5026-39 at one half of the density.

TABLE 1

DENISTY AND RESIN CONTENT OF UNIFORM DENSITY INFILTRATED SAMPLES

| SAMPLE NO. | SUBSTRATE | RESIN | INITIAL WEIGHT (g) | INITIAL DENSITY ($lb_m/ft^3$) | FINAL WEIGHT (G) | FINAL DENSITY ($lb_m/ft^3$) | AVERAGE WT % RESIN |
|---|---|---|---|---|---|---|---|
| 944 | Li-900 | PMMA | 27.863 | 8.12 | 48.143 | 14.0 | 42.00 |
| 221 | AETB-20 | PMMA | 5.611 | 8.16 | 9.249 | 13.4 | 40.10 |
| 311 | AETB-50 | PMMA | 5.634 | 8.04 | 9.211 | 13.4 | 39.90 |
| CF-181 | Carbon | PMMA | 42.044 | 12.18 | 60.837 | 17.6 | 30.89 |
| 183 | Li900 | Epoxy | 6.138 | 8.92 | 10.045 | 14.6 | 38.90 |
| 251 | AETB-20 | Epoxy | 6.529 | 8.03 | 9.490 | 13.8 | 41.70 |
| 362 | AETB-50 | Epoxy | 5.652 | 6.21 | 9.619 | 14.0 | 41.20 |
| 961 | Li-900 | Phenolic | 28.082 | 6.21 | 40.403 | 14.2 | 41.89 |
| 303 | AETB-20 | Phenolic | 6.026 | 8.76 | 10.014 | 14.5 | 39.80 |
| 392 | AFTB-50 | Phenolic | 5.444 | 7.91 | 9.500 | 13.8 | 42.70 |
| CF161 | Carbon | Phenolic | 41.421 | 12.10 | 59.751 | 17.4 | 30.68 |
| M302 | Li-900 | Arylacetylene | 2.188 | 7.79 | 3.746 | 13.3 | 41.58 |
| M303 | AETB-20 | Arylacetylene | 1.885 | 9.06 | 3.077 | 14.8 | 38.75 |
| M375A | AETB-20 | RTV 655 | 1.7937 | 8.47 | 2.894 | 14.4 | 39.25 |
| B6 | Li-900 | PBI | 5.68 | 8.13 | 8.84 | 13.3 | 35.75 |
| B8 | Carbon | PBI | 8.27 | 12.24 | 11.52 | 17.06 | 28.2 |

*Percent of resin at the center and surface if the sample are within ±3 wt % of the average resin content (wt %)

TABLE 3

COMPARISON OF ABLATION CHARACTERISTICS OF L.CA AND PRIOR ART

| Simulated re-entry heating condition | Abiative properties | LCA: present invention Density = 0.23 g/cc | AVCOAT-5026-39 Prior Art Density = 0.498 g/cc | General comments/ model configuration |
| --- | --- | --- | --- | --- |
| 1200 kW/m$^2$ | Recession, cm | 0.008 | 0.094 | 15.24 cm dia. flat face cylinder model |
| 1200 kW/m$^2$ | Mass loss, gm | 1.20 | 34.90 | 15.24 cm dia. flat face cylinder model |
| 4530 kW/m$^2$ | Recession, cm | 0.818 | 1.016 | 5.08 cm dia. hemispherical tip |
| 4530 kW/m$^2$ | Mass loss, gm | 8.89 | 16.46 | 5.08 cm dia. cylinder w/hemispherical tip |
| 16320 kW/m$^2$ | Recession, cm | 1.64 | 3.757 | 2.54 cm dia. cylinder w/hemispherical tip |
| 16320 kW/m$^2$ | Mass loss, gm | 4.11 | 9.090 | 2.54 cm dia. cylinder w/hemispherical tip |

7. Preparation of Partially Densified Phenolic Sample having a Density Gradient

A novolak phenolic resin (6 g of resin/40 ml of acetone) as described in 4a. above was prepared. An AETB-20 substrate having dimensions of about 2.5 cm×2.5 cm×2.5 cm (1.0 in.×1.0 in.×1.0 in.) was placed in a vacuum container. The phenolic solution was added to cover the substrate, and the vacuum was maintained until no further air bubbles were formed. The substrate was soaked in this phenolic solution for 24 hrs. The sample was then removed from the solution and cooled at 0°–10° C. for 1 hr. The sample was then cooled in an ice bath at 0° C. under vacuum (≦100 Torr) for one day to remove solvent. Next, the sample was heated in an oven at 80° C. for 24 hrs. and then at 100° C. for another 24 hrs. The sample was then cured at 140° C. for 4 hrs. and then at 200° C. for 12 hrs. The resin distribution within the substrate was determined by TGA the results of which are set forth in Tables 4a and 4b below. The resin distribution depends on how fast the solvent is removed, which in turn depends on the boiling point of the solvent, the sample size and the pressure of the system.

TABLE 4a

OVERALL DENSITY MEASUREMENT ON TEST SAMPLE 88B

| Test sample 88B | Density (lb$_m$/ft$^3$) |
| --- | --- |
| Before Impregnation (AETB-20 substrate) | 7.88 |
| After Impregnation | 14.2 |

TABLE 4b

DENSITY GRADIENT MEASUREMENT ON TEST SAMPLE 88B

| Location from top surface (in.) | Density (lb$_m$/ft$^3$) |
| --- | --- |
| 0.0 | 18.1 |
| 0.12 | 15.3 |
| 0.20 | 13.4 |
| 0.30 | 12.3 |
| 0.50 (center of sample) | 11.7 |

8. Preparation of Partially Densified Silicone Sample Having a Density Gradient

Silicone resin from General Electric (10 g of RTV 655A and 1 g of RTV 655B curing agent) was dissolved in 105 ml of toluene solvent. The substrate (AETB-20) having dimensions of about 2.5 cm×2.5 cm×2.5 cm (1.0 in.×1.0 in.×1.0 in.) was placed in a vacuum container and impregnated with the resin solution under vacuum for 1–2 hrs. The sample was then removed from the solution, and the solvent (toluene) was removed from the sample by evaporation at room temperature for 24 hrs. The sample was then heated at 100° C. for 1 hr. to curs the resin. The resin distribution within the substrate was determined by TGA as shown in Tables 5a and 5b below.

TABLE 5a

OVERALL DENSITY MEASUREMENT ON TEST SAMPLE M336A

| Test sample M335A | Density (lb$_m$/ft$^3$) |
| --- | --- |
| Before Impregnation (AETB-20 substrate) | 7.92 |
| After impregnation | 14.6 |

TABLE 5b

SILICONE RTV 655 RESIN DISTRIBUTION IN SAMPLE M336A

| Location from top surface (in.) | Wt. of resin (%) |
| --- | --- |
| 0.0 | 38–43 |
| 0.15 | 28–33 |
| 0.30 | 12–16 |
| 0.50 (center of sample) | 2–5 |

9. Preparation of Partially Densified Silicone Sample having a Density Gradient

Silicone resin from General Electric (5.8 g of RTV 577 and 1 drop of catalyst (dibutyl tin dilaurate) were dissolved in 52 ml of toluene solvent. The substrate (AETB-20) having dimensions of about 2.5 cm×2.5 cm×2.5 cm (1.0 in.×1.0 in.×1.0 in.) was placed in a vacuum container, evacuated and infiltrated with the silicon solution for about 1–2 hrs. The infiltrated sample was then removed from the solution, and the solvent (toluene) was removed by evaporation at room temperature for 24 hrs. The sample thus prepared was then cured at room temperature. The resin distribution within the substrate was determined by TGA, the results of which are set forth in Tables 6a and 6b below.

TABLE 6a

OVERALL DENSITY MEASUREMENT ON TEST SAMPLE M374A

| Test sample M374A | Density ($lb_m/ft^3$) |
|---|---|
| Before Impregnation (AETB-20 substrate) | 7.90 |
| After Impregnation | 14.3 |

TABLE 6b

SILICONE RTV 577 RESIN DISTRIBUTION IN SAMPLE M374A

| Location from top surface (in.) | Wt. of resin (%) |
|---|---|
| 0.0 (at surface) | 78–82 |
| 0.15 | 35–40 |
| 0.30 | 5–6 |
| 0.50 (center of sample) | 2–4 |

10. Preparation of Partially Densified PMMA Sample having a Density Gradient

Low molecular weight PMMA from Aldrich Chemical Company (9 g, MW=$10^4$–$10^5$) was dissolved in 100 ml of acetone. An evacuated AETB-20 substrate having a density of 0.13 g/cc (8.4 $lb_m/ft^3$) and dimensions of about 2.54 cm cube was impregnated with the resin solution under vacuum for 0.5 hrs. The infiltrated sample was then removed from the solution, and the solvent was removed at room temperature by evaporation. The resin distribution in the substrate was measured by TGA as shown in Table 7 below. The final density of the sample was about 0.24 g/cc (15 $lb_m/ft^3$).

TABLE 6

PMMA DISTRIBUTION IN AETB-20 SAMPLE

| Location from top surface in. | Wt. of resin (%) |
|---|---|
| 0.0 | 70–75 |
| 0.15 | 60 |
| 0.30 | 11–17 |
| 0.50 (center of sample) | 2–5 |

11. Preparation of PBI Sample having a Density Gradient

PBI resin in DMSO was heated at 100°–150° C. to form a 9–10 wt % solution. An evacuated LI-900 substrate having dimensions of about 2.54 cm cube was infiltrated with hot PBI resin/DMSO solution. The infiltrated sample was then removed from the solution and the solvent in the sample was removed by evaporation at 100°–150° C. under vacuum (≦100 Torr). The sample was then heated at 400° C. for 2 hours to remove any remaining DMSO and to sinter the PBI resin. The final density of the infiltrated sample was about 0.22 g/cc (14 $lb_m/ft^3$). TGA was used to determine the weight percent distribution of resin within the substrate as shown in Table 7 below.

TABLE 7

PBI DISTRIBUTION IN LI-900 SAMPLE

| Location from top surface in. | Wt. of resin (%) |
|---|---|
| 0.0 | 77 |
| 0.15 | 60–64 |
| 0.30 | 10 |
| 0.50 (center of sample) | 3 |

It should further be apparent to those skilled in the art that various changes in form and detail of the invention as shown and described above may be made. It is intended that such changes be included within the spirit and scope of the claims appended hereto.

What is claimed is:

1. A method for making a uniform density resin impregnated ceramic article comprising the steps of
(a) providing a matrix of ceramic fibers; (b) immersing the matrix of ceramic fibers in a solution of a low boiling solvent and a thermoplastic resin having a molecular weight of from $10^5$ to $10^7$, said solution having a viscosity of from 20,000–100,000 cps; and (c) removing the solvent from the matrix of ceramic fibers by evaporation at atmospheric pressure to form a thermoplastic resin film on the ceramic fibers.

2. The method of claim 1, wherein said removing step comprises immersing the matrix of ceramic fibers in a non-solvent for the thermoplastic resin.

3. The method of claim 1, wherein said immersing step comprises evacuating the matrix of ceramic fibers.

4. The method of claim 1, wherein the content of thermoplastic resin throughout the ceramic article is uniform to within ±10 wt % of the average resin content (in wt %) of the ceramic article.

5. A method for making a uniform density resin impregnated ceramic article comprising the steps of (a) providing a matrix of ceramic fibers; (b) immersing the matrix of ceramic fibers in a solution of a low boiling point solvent and a thermoplastic resin having a molecular weight of from $10^4$ to $10^5$; (c) removing the solvent from the matrix of ceramic fibers by immersing in a non-solvent for the thermoplastic resin to precipitate thermoplastic resin throughout the matrix of ceramic fibers; and (d) removing the non-solvent and remaining solvent from the matrix of ceramic fibers, by evaporation to form a thermoplastic film on the ceramic fibers.

6. A method for making a uniform density resin impregnated ceramic article comprising the steps of (a) providing a matrix of ceramic fibers; (b) immersing the matrix of ceramic fibers in a solution of a solvent and an organic thermosetting resin; (c) partially curing the thermosetting resin to form a gel; (d) removing the solvent from the matrix of ceramic fibers; and (e) further curing the thermosetting resin within the matrix of ceramic fibers to form a cured film of the thermosetting resin on the ceramic fibers.

7. The method of claim 6, wherein said immersing step comprises evacuating the matrix of ceramic fibers.

8. The method of claim 6, wherein said partial curing step comprises heating.

9. The method of claim 6, wherein said removing step comprises heating under vacuum.

10. The method of claim 6, wherein the content of the cured thermosetting resin throughout the ceramic article is uniform to within ±10 wt % of the average resin content (in wt %) of the ceramic article.

11. A method for making a non-uniform resin impregnated ceramic article where the resin is distributed so as to provide a density gradient along at least one direction of the ceramic article, comprising the steps of (a) providing a matrix of ceramic fibers (b) immersing the matrix of ceramic fibers in a solution of a solvent and a thermoplastic resin having a molecular weight of from $10^3$ to less than $10^5$; and (c) removing the solvent from the matrix of ceramic fibers by one or both of heating at a temperature of from 30° to 200° C. and applying a vacuum to form a thermoplastic resin film on the ceramic fibers.

12. The method of claim 11, wherein said immersing step comprises evacuating the matrix of ceramic fibers.

13. The method of claim 11, wherein the density at an outer surface of the resin impregnated ceramic article is from 0.27 to 0.82 g/cc and the density at the center of the ceramic article is from 0.14 to 0.25 g/cc.

14. A method for making a non-uniform resin impregnated ceramic article wherein the resin is distributed so as to provide a density gradient along at least one direction of the ceramic article, comprising the steps of (a) providing a matrix of ceramic fibers; (b) immersing the matrix of ceramic fibers in a solution of a solvent and an organic thermosetting resin; (c) removing the solvent from the matrix of ceramic fibers by applying one or both of heat and vacuum without allowing the resin solution to gel; and (d) curing the thermosetting resin within the matrix of ceramic fibers to form a cured film of the thermosetting resin on the ceramic fibers.

15. The method of claim 14, wherein said immersing step comprises evacuating the matrix of ceramic fibers.

16. The method of claim 14, wherein the density at an outer surface of the resin impregnated ceramic article is from 0.27 to 0.82 g/cc and the density at the center of the ceramic article is from 0.14 to 0.25 g/cc.

* * * * *